Sept. 15, 1970     B. G. BARTON     3,528,668
MODULAR INTER-WALL SEAL UNIT
Filed Aug. 14, 1967     3 Sheets-Sheet 1
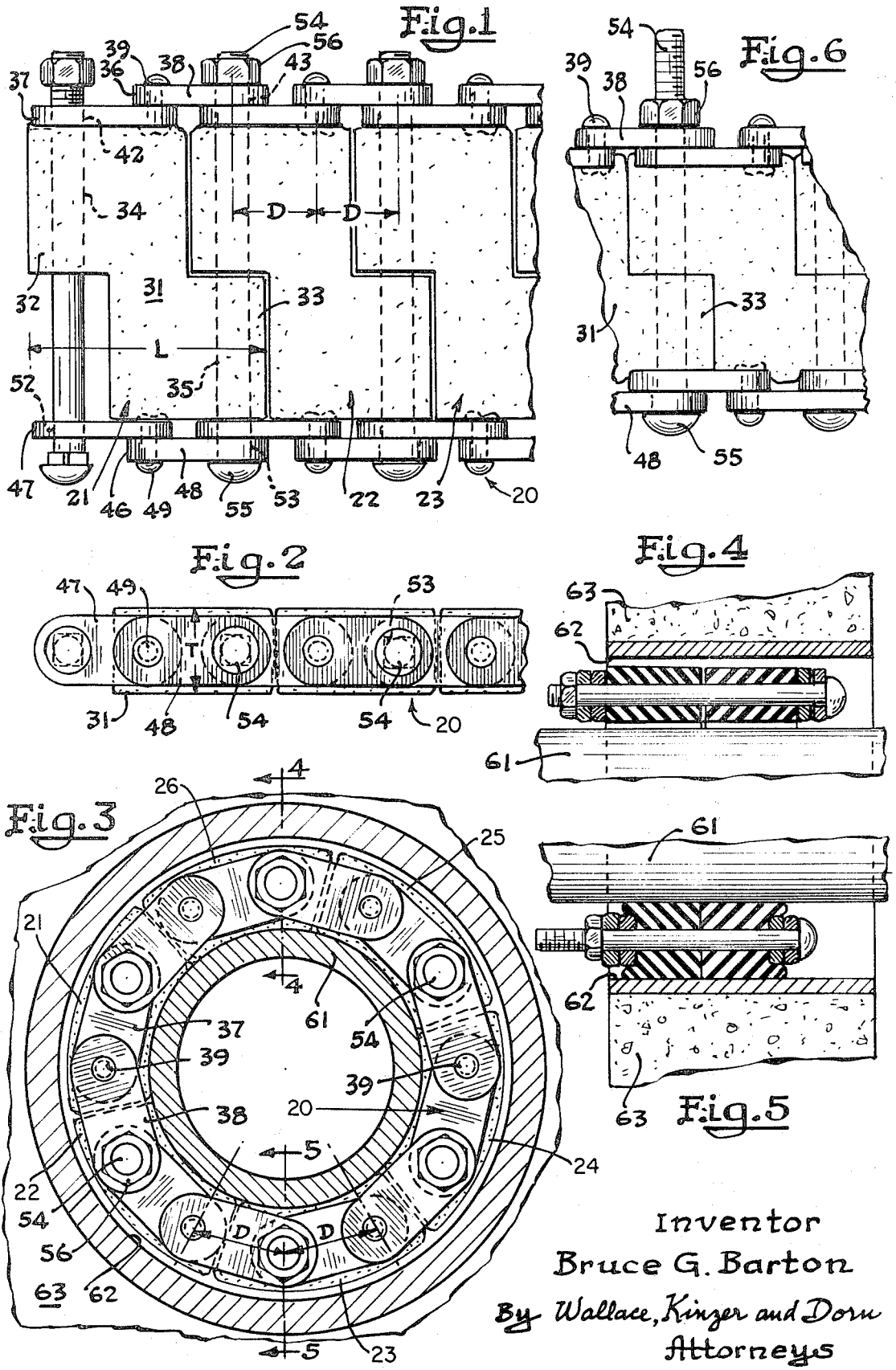
Inventor
Bruce G. Barton
By Wallace, Kinzer and Dorn
Attorneys Sept. 15, 1970     B. G. BARTON     3,528,668
MODULAR INTER-WALL SEAL UNIT
Filed Aug. 14, 1967     3 Sheets-Sheet 2
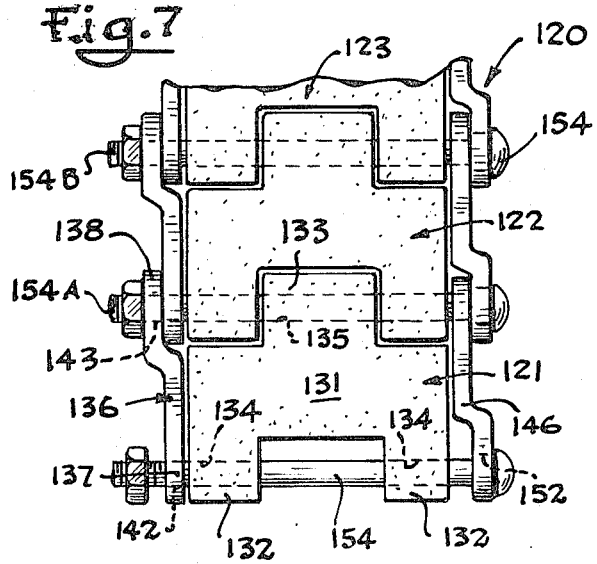
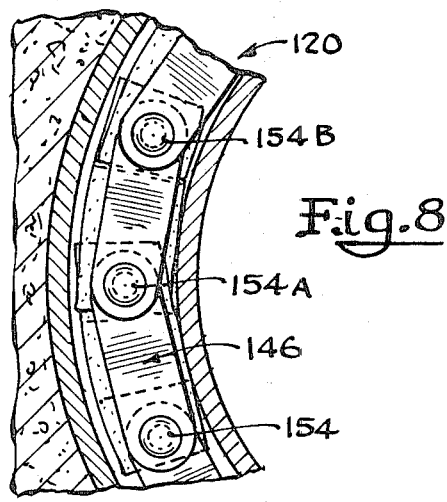
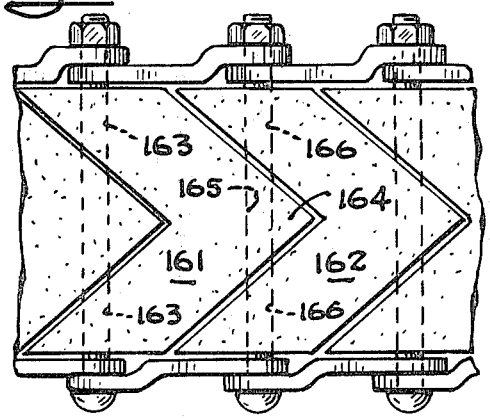
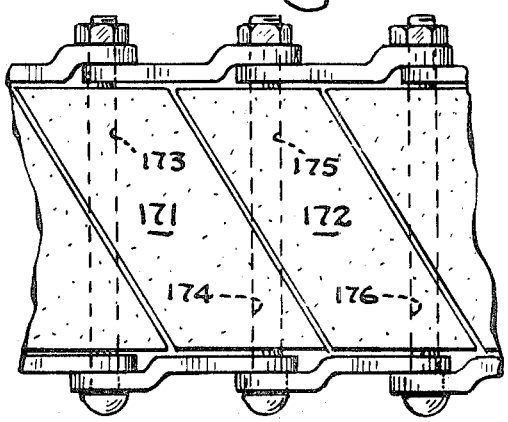
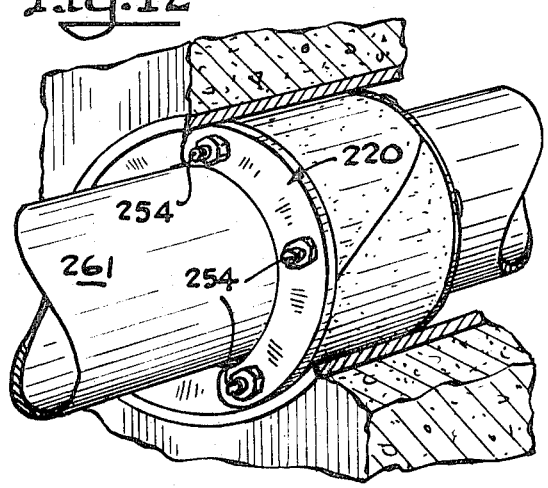
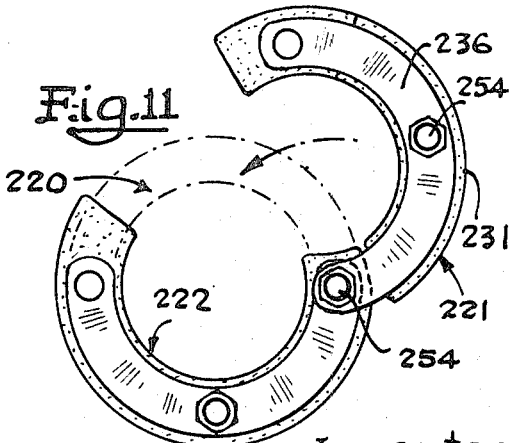
Inventor
Bruce G. Barton
By Wallace, Kinzer and Dom
Attorneys Sept. 15, 1970   B. G. BARTON   3,528,668
MODULAR INTER-WALL SEAL UNIT
Filed Aug. 14, 1967   3 Sheets-Sheet 3

Inventor
Bruce G. Barton
By Wallace, Kinzer and Dorn
Attorneys

United States Patent Office 3,528,668
Patented Sept. 15, 1970

3,528,668
MODULAR INTER-WALL SEAL UNIT
Bruce G. Barton, Livonia, Mich., assignor to Thunderline Corporation, Inkster, Mich., a corporation of Michigan
Filed Aug. 14, 1967, Ser. No. 660,486
Int. Cl. F16j 9/16, 15/02
U.S. Cl. 277—199                                       11 Claims

ABSTRACT OF THE DISCLOSURE

A modular seal assembly, formed from a plurality of interconnected modular sealed units, seals the space between a pipe or other conduit and the encompassing surface of an opening in a vault or other wall through which the conduit projects. Each of the modular seal units includes a resilient elastomer seal block interfitting at its ends with the seal blocks of adjacent units in the annular assembly. There are two pressure rings, one on each face of the annular seal block assembly; each pressure ring comprises a series of pressure plate members individually associated with the seal blocks and linked at opposite ends to the pressure plates of adjacent modular units. The complete assembly is held together by bolts that interconnect both the pressure plates and the seal blocks, projecting through appropriate apertures in the blocks. The assembly is expanded to fit a variety of different size conduits by adding additional modular units. In one embodiment, the pressure plate members associated with each block are themselves of articulated construction to permit greater curvature of the modular unit. A number of different configurations suitable for the elastomer seal blocks are shown, including V-shaped, parallelogram, Z-shaped, and U-shaped configurations. In the simplest embodiment disclosed, there are just two elastomer blocks and two sets of semicircular pressure plates, but a greater number of units in an individual seal assembly are preferred for greater flexibility in relation to variations in conduit size.

BACKGROUND OF THE INVENTION

(A) Field of application

There are a variety of different applications in which it is necessary to afford a liquid-tight seal for an electrical conduit, a pipe, or other conduit that extends through a wall. Typical examples are underground electrical vaults, pits, tunnels, bridges, and the like. In addition to sealing the wall through which the conduit extends against egress or ingress of water and other liquids, it is frequently necessary to provide for shock absorption. Thus, in an underground electrical vault, electrical conduits should be cushioned against shock, particularly where the vault is located beneath a roadway. Sealing may also be necessary for electrical or thermal purposes.

(B) The prior art

In the construction of seals for pipes and other conduits projecting through walls in vaults, pits, and other underground chambers, a variety of seal constructions have been used. For example, tapered plugs of relatively resilient material have been employed. Oakum-lead packing ring combinations have been utilized, much like the seals incorporated in waste pipes in plumbing systems. These relatively conventional seals have a high tendency toward failure. Furthermore, they may be costly and time-consuming in installation and may require a high degree of skill on the part of the workman assembling the seal.

Another form of seal or packing suitable for applications of this kind is shown in Mainprize Pat. No. 2,964,-342. The Mainprize patent employs a cylindrical sealing body of rubber or similar elastomer material with pressure rings embedded in the opposite faces of the rubber cylinder. A series of bolts connect the two pressure rings, being threaded into appropriate connectors mounted on one of the rings, pulling the pressure rings toward each other. The resultant axial compression of the cylindrical rubber body causes that member to expand circumferentially and seal the space between a conduit that runs axially through the body member and an encompassing wall opening.

The Mainprize construction is a substantial improvement over some earlier and more conventional seal arrangements but in turn offers some difficulties. For example, the Mainprize seal assembly must be placed in the wall before the pipe or other conduit is extended therethrough or else must be moved into position along what may be a rather long length of pipe. Of perhaps greater importance, the construction shown in the patent is suitable only for one particular size of conduit projecting through a wall opening of specific size, and cannot accommodate substantial changes either in the outside diameter of the conduit of the inside diameter of the wall opening.

SUMMARY OF THE INVENTION

A modular wall unit constructed in accordance with the present invention, and specifically constructed for assembly in end-to-end relation to a plurality of similar seal units to afford a complete annular shock absorbing seal, comprises a resilient seal block of compressible elastomer material such as rubber or neoprene. The seal block is of given thickness with offset ends and has two bolt-receiving apertures extending through the opposite ends of the block at a predetermined spacing from each other. First and second pressure plate members are included in the modular seal unit, each plate member having a length approximately equal to the length of the seal block and further having two bolt-receiving apertures extending through the opposite ends of the plate member at the aforesaid predetermined spacing in alignment with the corresponding apertures in the seal block. The opposite ends of each plate member are offset from each other by a distance approximately equal to plate thickness to provide for overlapping assembly with the pressure plate members of adjacent seal units. In the preferred construction, the offset is obtained by constructing each pressure plate member as an articulated assembly of two pressure plate elements pivotally connected to each other. Each modular seal unit further includes a bolt member that extends through one aperture in each pressure plate member and through one aperture in the seal block. This same bolt member further extends through one aperture of the seal block in an adjacent seal unit and through one aperture of a pressure plate in that adjacent seal unit when the units are assembled in a complete annular seal assembly. Tightening of the bolt members of the assembly compresses the individual seal blocks in an axial direction and expands the thickness of the seal blocks in a radial direction to complete the desired seal.

The modular seal units of the present invention can be fitted to a variety of different pipe sizes simply by incorporating additional modular seal units in the overall assembly.

The modular seal units of the present invention afford a similar flexibility with respect to variations in the difference between the outside diameter of the pipe and the inside diameter of the wall opening in which the seal is to be mounted. Thus, insulator blocks having different thicknesses can be assembled with the same pressure plate members and bolts to accommodate quite different radial spacings between the pipe and the wall surface.

Because the elements of the modular seal units, the pressure plate members, the seal blocks, and the bolt members, can be completely standardized, tooling costs are held to a minimum. Furthermore, labor costs for assembly are quite low, especially since the assembly of a seal unit for 2½ inch pipe entails exactly the same steps, although repeated an additional number of times, as the assembly of a complete seal for a 1¼ inch pipe. The true modular nature of the seal units thus affords substantial economies both in manufacture and in assembly.

In the field, it is a simple matter to remove one bolt from the assembly of modular seal units and open up the seal unit so that it can be placed around the pipe at a point immediately adjacent the wall opening in which the seal is required. There is no necessity for positioning of the seal assembly in the wall before the pipe is brought into position and there is no requirement to slide the seal assembly along any substantial length of pipe. Moreover, if an error has been made in determination of the pipe size, it is a simple matter to add or subtract a modular seal unit at the time of application in the field to avoid any delay in completing the seal.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE DRAWINGS

FIG. 1 is a plan view, partially cut away, of a shock absorbing seal assembly, disconnected at one point and laid flat, constructed in accordance with one embodiment of the present invention;

FIG. 2 is an end elevation view of the seal assembly of FIG. 1;

FIG. 3 is an end elevation view, partly in cross section, showing the seal assembly of FIGS. 1 and 2 disposed in operating position for sealing an annular space between a pipe and an encompassing wall surface;

FIG. 4 is a sectional view taken approximately along line 4—4 in FIG. 3;

FIG. 5 is a sectional view, similar to FIG. 5 but showing the configuration of the parts after the seal has been tightened in place, taken along line 5—5 in FIG. 3;

FIG. 6 is a fragmentary plan view, like FIG. 1, illustrating the effect of tightening of the bolts of the seal;

FIG. 7 is a plan view, like FIG. 1, of a modification of the present invention using somewhat different pressure plates and a different block configuration;

FIG. 8 is a partial elevation view, similar to FIG. 3, of the seal assembly of FIG. 7 in operative position;

FIGS. 9 and 10 are detail views of other suitable configurations for the seal blocks;

FIG. 11 is an end elevation view, in open condition, of another embodiment of the invention;

FIG. 12 is a perspective view of the embodiment of FIG. 11 in assembled condition.

DESCRIPTION OF THE PREFERRED EMBODIMENTS

Figure 13:
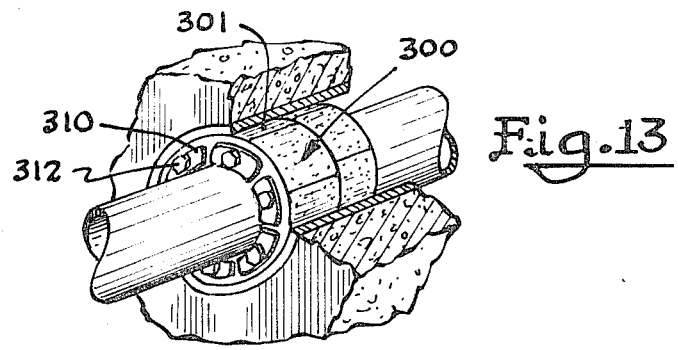
FIGS. 13 through 16 are perspective views of another embodiment of the invention.

A preferred form of shock absorbing seal assembly 20 is illustrated in FIGS. 1–6. Seal assembly 20 comprises a plurality of individual modular seal units 21, 22, 23, 24, 25, and 26 constructed in accordance with the present invention and interlinked with each other to constitute an annular shock absorbing seal, as best shown in FIG. 3.

The initial modular seal unit 21 comprises a seal block 31 of what may be described as orthogonal Z-shaped configuration (see FIG. 1). Seal block 31 is fabricated from a resilient compressible elastomer material such as rubber, neoprene, or the like. The seal block is of a given thickness T (FIG. 2). Furthermore, as seen in the plan view of FIG. 1, the opposite ends 32 and 33 are offset with respect to each other as the result of the essentially Z-shaped configuration of the block. A first bolt receiving aperture 34 extends through the one end 32 of seal block 31 and a corresponding bolt receiving aperture 35 is provided in the opposite end 33 of the seal block.

At the top of seal block 31, as seen in FIG. 1, there is a first pressure plate member 36 that is a part of modular seal unit 21. Pressure plate member 36 is of articulated construction and includes a first pressure plate element 37 that extends along the side of the one end portion 32 of seal block 31. Pressure plate element 37 is pivotally connected to a second pressure plate element 38 by appropriate means such as a rivet or other pin connector 39. Plate element 38 extends the overall length of the pressure plate member 36 such that the total length of the pressure plate member 36 such that the total length of the pressure plate member is approximately equal to the overall length L of seal block 31. At one end of pressure plate member 36, in element 37, there is a bolt-receiving aperture 42 aligned with the aperture 34 in the seal block. At the other end of pressure plate member 36, in element 38, there is another aperture 43 aligned with the aperture 35 in the seal block.

On the opposite side of modular unit 21, the lower side as viewed in FIG. 1, there is a second pressure plate member 46 that is essentially similar in construction to member 36. Thus, pressure plate member 46 includes two individual pressure plate elements 47 and 48 pivotally joined by a pin or like member 49. Plate element 47 has an aperture 52 aligned with the sealing block aperture 34. Similarly, plate element 48 has an aperture 53 aligned with sealing block aperture 35.

Modular unit 21 further includes a bolt member 54. The head 55 of the bolt is provided with a short shank portion of square or other non-circular configuration fitting into the correspondingly shaped aperture 53 in plate element 48 to inhibit rotation of the bolt when in place. Bolt 54 projects through seal block aperture 35 and through plate element aperture 43 and is engaged by an appropriate retainer nut 56.

The remaining modular units 22–26 are essentially similar in construction to modular unit 21; accordingly, there is no necessity for a detailed description of the additional seal units. The manner in which the seal units are joined together to form the complete assembly 20 is clearly apparent from FIGS. 1–3. As seen in FIG. 1, the bolt 54 for modular unit 21 extends through an aperture in the seal block of adjacent modular unit 22 and through apertures in the two pressure plates for the seal unit 22 to interlock the units 21 and 22. A corresponding interlock is provided by each of the bolt members for each of the seal units. In the field, one bolt is removed and the assembly 20 is wrapped around a pipe or other conduit such as the pipe 61 (FIG. 3). The missing bolt is then reinserted through the adjacent overlapping ends of the two end units and the seal assembly is ready for installation to seal the external surface of a conduit 61 to the internal surface 62 of a wall 63 through which the conduit passes (FIG. 3).

When the seal assembly 21 is first placed in position, it may have a relatively loose fit with respect to conduit 61 and surface 62, as shown in FIGS. 3 and 4. To complete the seal, the nut on each of the bolts, such as nut 56 on bolt 54, is tightened. Continued tightening of the nuts forces the two pressure plates for each modular seal unit toward each other. This compresses the ring of seal blocks between the two rings of pressure plate members, in an axial direction relative to the axis of the seal assembly, and causes each seal block to expand in a radial direction. Expansion may occur both radially inwardly and radially outwardly. Thus, when all of the bolts have been tightened to the condition shown in FIGS. 5 and 6, a complete seal between the external surface of conduit 61 and the internal surface 62 of the wall opening is provided, as shown in FIG. 5. FIG. 6 is a fragmentary plan view showing the effect of tightening of the bolts of the seal assembly and illustrating the confining effect of the pressure plates, forcing most of the rubber to expand in a radial direction to provide the desired tight seal.

In relation to the most frequently encountered pipe sizes in electrical vaults, pits, and other applications for seal assembly 20, it has been found that the lengths of the plate elements or links such as elements 37, 38, 47 and 48 can be somewhat greater than one inch. The center-to-center spacing D between the pivot points of the articulated pressure plate members is preferably held to slightly less than one inch.

This provides a sufficient number of pivot points around the assembly to accommodate relatively small diameter pipe, such as 1¼ inch pipe. At the same time, the modular seal units are large enough, using pressure plate elements of this size, so that a limited number of seal units completes an assembly accommodating a relatively large pipe, such as 2½ inch pipe. For example, with a plate element pitch D of approximately 13/16 inch, four of the modular seal units will accommodate a pipe of 1¼ inch outside diameter, five units serve a pipe of 1½ inch outside diameter, a six-unit assembly such as assembly 20 is suitable for a two inch pipe, a seven unit assembly fits a 2½ inch pipe, etc.

The modular seal units, such as units 21–26, afford a similar flexibility with respect to variations in the radial distance between the outer surface of the pipe 61 and the inner surface 62 of the wall opening. Thus, seal blocks of thickness T equal to ⅝ inch may be appropriate where the radial opening to be sealed is within a first given range. A block thickness T of ⅞ inch, on the other hand, will accommodate a substantially larger radial distance between the pipe and the wall opening. And a thickness of 1¼ inch for the seal block can be used, with the same pressure plates, to accommodate even larger wall openings relative to the selected pipe size.

FIGS. 7 and 8 illustrate a shock absorbing seal assembly 120 comprising a further embodiment of the present invention. Assembly 120 comprises a plurality of individual modular seal units 121, 122, 123, etc., constructed in accordance with the present invention and assembled in end-to-end relation to form the required assembly.

Seal unit 120 is typical of the modular units employed in the embodiment of FIGS. 7 and 8. It comprises a seal block 131 formed of rubber, neoprene, or other elastomer material. In this instance, the seal block is of generally U-shaped configuration, with a projection 133 at one end of the block projecting toward the open portion of the adjacent U-shaped block in seal unit 122. The two legs 132 of the seal block 131, constituting one end of the seal block, are provided with a bolt-receiving aperture 134. The opposite and offset end 133 of seal block 131 is provided with a corresponding bolt-receiving aperture 135.

Modular unit 121 includes a first pressure plate member 136 having two bolt-receiving apertures 142 and 143 at its opposite ends. The one end 138 of plate member 136 is offset with respect to the opposite end 137 by a distance approximately equal to the thickness of the pressure plate in order to provide for overlapping assembly with respect to the pressure plate of an adjacent modular unit, as clearly illustrated in FIG. 7.

Modular unit 121 further comprises a bolt member 154 extending through the aperture 134 in the split end 132 of seal block 131. Bolt member 154 further extends through one aperture 142 in pressure plate 136 and through one of the bolt-receiving apertures 152 in a second pressure plate member 146 located on the opposite side of the modular unit. As shown by bolts 154A and 154B in FIG. 7, the bolt member of each modular unit also projects through the apertures in the pressure plates and in one end of the seal block for an adjacent modular unit, joining all of the modular units in a complete assembly.

The construction shown in FIGS. 7 and 8 offers the same basic advantages as that of FIGS. 1–6. The unitary construction for the individual pressure plates of the modular units in the arrangement of FIGS. 7 and 8 avoids the necessity for the rivets or other articulation configurations utilized in the construction of FIGS. 1–6. However, the individual pressure plates in assembly 120 must be kept short enough to accommodate relatively small changes in pipe size, with the result that the overall lengths of the seal blocks and pressure plates are smaller than is possible with the articulated construction of the first embodiment. Consequently, the embodiment of FIGS. 7 and 8, in a given application, may be slightly more expensive, depending upon the number of different pipe sizes that must be accommodated.

FIG. 9 shows a different configuration that may be utilized for the seal block in either of the two modular seal assemblies 20 and 120 described above. The offset blocks 161 and 162 illustrated in FIG. 9 are basically of V-shaped configuration. One end of the block 161, comprising the two extending legs of the V, is provided with a transverse bolt-receiving aperture 163 that goes through both legs. The bight or nose portion 164 of block 161 is provided with a bolt-receiving aperture 165 that is aligned with the two-part aperture 166 in adjacent block 162. It is thus seen that the V-shaped or "herringbone" block construction of FIG. 9 affords the same interlocking and sealing arrangement as provided by the different block configurations illustrated particularly in FIGS. 1 and 7.

FIG. 10 illustrates another relatively simple block configuration that may be incorporated in modular seal units constructed in accordance with the invention. The two seal blocks 171 and 172 shown therein are both of parallelogram configuration with two of the angles in each being acute angles. Block 171 is provided with first and second bolt-receiving apertures 173 and 174 which are normal to the exposed side edges of the block and which terminate approximately in the center of the internal edges of the block. The adjacent seal block 172 is provided with similar bolt-receiving apertures 175 and 176, aperture 175 being aligned with the aperture 174 in block 171. With this arrangement, it will be seen that the bolts of the modular seal units join the individual seal blocks together and squeeze the blocks into what amounts to a continuous shock absorbing seal element.

FIGS. 11 and 12 illustrate an annular shock absorbing seal assembly 220 constructed from just two modular seals units 221 and 222. Modular seal unit 221 comprises a relatively large seal block 231 having a plurality of bolt-receiving apertures extending therethrough. A first arcuate pressure plate 236 is mounted upon one face of the seal block 231 and a second similar arcuate pressure plate is mounted upon the opposite face of the seal block. Mounting is effected by means of a plurality of appropriate mounting bolts 254. The second modular seal unit 222 of assembly 220 is similar in construction, one of the mounting bolts 254 serving as a pivot pin between the two sections of the seal assembly.

For installation, seal assembly 220 may be split as illustrated in FIG. 11 and then placed around the pipe or other conduit such as the conduit 261 in FIG. 12. The bolt or bolts 254 removed to split the unit are then replaced, completing the annular seal assembly, after which the retaining nuts on the bolts are all tightened to complete the seal as shown in FIG. 12.

The construction illustrated in FIGS. 11 and 12, constituting assembly 220, does not afford all of the advantages of the previously described embodiments of the invention. In particular, it is not as flexible with respect to use with pipes or conduits of varying size, although a short modular unit can be inserted to provide for a small pipe size increase. On the other hand, this modification of the invention does permit installation without requiring placement of the seal assembly in the wall aperture before insertion of the pipe or conduit and without requiring that the seal assembly be moved longitudinally over the pipe from some distant point to the point of conjunction with the wall. Moreover, its relatively simple construction permits the substitution of a thicker wall block at any time to accommodate a wall opening of greater dimensions.

Figure 15:
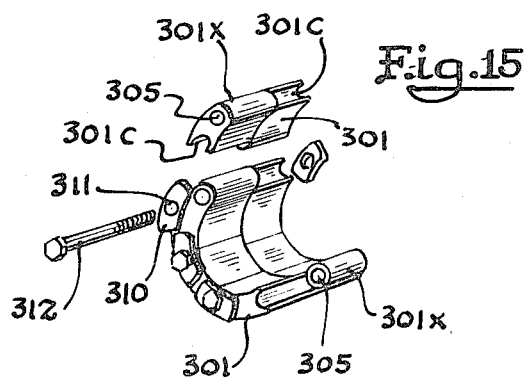
Figure 14:
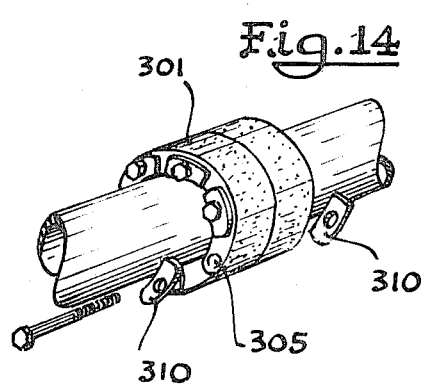

Another preferred form of the invention is illustrated in FIGS. 13 through 16, identified as the seal assembly 300, FIG. 13, and in this instance the resilient, compressible seal blocks 301, while of segmental form, have opposite corners notched and arcuately recessed to afford concave surfaces 301C, FIG. 15. The other corners are extended and present bosses having convex ends 301X. The boss of one block fits complementally into the concave recess of a second block and the two can rotate or articulate, so that again each block has off-set ends to be interlocked, FIG. 16.

Figure 16:
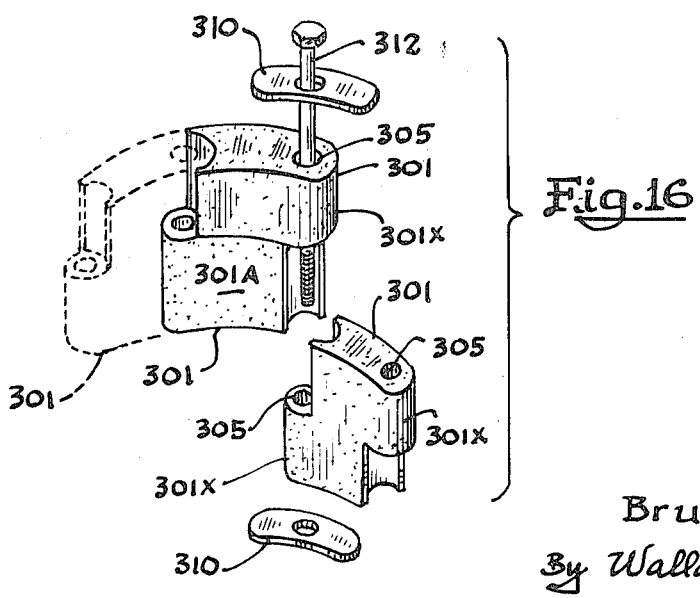

The convex or boss end 301X of each block is formed with an aperture 305 extending therethrough, and as will be recognized from FIGS. 15 and 16 the aperture 305 in one block will be aligned with the aperture 305 in the adjacent block when the two are interfitted. Assembly, for installation, is completed by utilizing individual pressure plates and bolt members which enable expansion to be effected in achieving a tight seal.

Thus, individual, relatively short pressure plates 310 are arranged on the opposite faces of the individual blocks, and each pressure plate is provided with an aperture 311 through which a bolt 312 can be extended. The pressure plates are of arcuate form, conforming to the radius of curvature of the expansion blocks to which each is related, and are of such length to at least overlap the mating ends of the blocks. The pressure plates are set on the opposite faces of the blocks with the apertures 311 thereof aligned with the aligned apertures 305 in the interfitted expansion blocks, whereafter each bolt 312 is passed through the aligned apertures. The apertures in the pressure plates corresponding to the threaded end of each bolt are themselves threaded, serving as nuts, and when run up on the threaded ends of the bolts afford a complete assembly. In its relaxed state, the assembly 300, FIG. 13, can be interposed between the members to be sealed, whereafter the bolts are in effect tightened to produce the desired expansion and seal fit. Of course, the assembly 300 may be split as well, fitted about the interior member to be sealed, FIG. 16, and then the loose ends may be joined by the remaining bolt.

It will be appreciated from the description thus set forth with respect to FIGS. 13 through 16 that utilization of complemental bosses presenting the convex ends 301X in conjunction with the concave surfaces or sockets 301C enables a ball and socket interior fit to be achieved, at the interfitted ends of the blocks, accounting for an efficient interior seal between the interlocked ends of the blocks. At the same time, the concentric inner and outer arcuate surfaces 301A and 301B of each block enables efficient concentric or radial seals to be achieved with respect to the members, FIG. 13, between which the assembly 300 is interposed.

I claim:

1. An annular shock-absorbing seal assembly comprising a plurality of modular seal units connected together in continuous end-to-end relation to form a ring, each modular seal unit comprising:

a seal block of resilient compressible elastomer material of given thickness having offset ends and having two bolt-receiving apertures extending through the opposite ends of the block at a predetermined spacing from each other, the apertures in adjacent ends of adjoining blocks being substantially coaxial with each other when in assembled end-to-end relation;

first and second pressure plate members of predetermined thickness, each plate member having a length approximately equal to the length of said seal block and each plate member having at least one bolt-receiving aperture extending through the plate member; and a bolt member extending through one aperture in each pressure plate member and through one aperture in said seal block to mount said pressure plate members on said block, said bolt member extending through one aperture of the seal block of an adjacent seal unit so that tightening of the bolt member compresses the seal blocks of the two adjacent seal members to expand the thickness of the seal blocks and complete a seal.

2. A modular seal unit according to claim 1 in which each pressure plate member has two apertures spaced from each other by a distance equal to said predetermined spacing and in which the opposite ends of each of said plate members are offset from each other by a distance approximately equal to the plate thickness to provide an overlapping assembly with the pressure plate members of adjacent seal units.

3. A modular seal unit assembly according to claim 2 in which each of said first and second pressure plate members is of articulated construction, comprising a first flat plate element pivotally connected in overlapping relation to a second flat plate element, so that the opposite ends of the complete pressure plate member are offset by the thickness of the individual plate elements.

4. A modular seal unit assembly according to claim 1 in which each said seal block is of orthogonal Z-shaped configuration with the bolt-receiving apertures of the block extending through the projecting legs of the block.

5. A modular seal unit assembly according to claim 1 in which each said seal block is of V-shaped configuration with one of said two bolt-receiving apertures extending transversely of the V through the two projecting legs of the V and the other of said two bolt-receiving apertures extending transversely of the bight portion of the V.

6. A modular seal unit assembly according to claim 1 in which each said seal block has the approximate configuration of an acute parallelogram, each of said two bolt-receiving apertures extending approximately normal to one side of the block and terminating in the center portion of an adjacent side of the block.

7. A modular seal unit assembly according to claim 1 in which each said seal block is of generally U-shaped configuration with one end portion projecting away from the bight of the U to fit into the center portion of an adjacent seal block, one of said bolt-receiving apertures extending transversely of the two legs of the U and parallel to the bight portion thereof and the other of said bolt-receiving apertures extending through said projecting end portion.

8. A modular seal unit assembly according to claim 1 in which each of said pressure plate members is of arcuate configuration.

9. A modular seal unit assembly according to claim 1 in which each said seal block, at each end, presents a projecting cylindrical-surfaced boss and an adjacent recessed socket, the boss being adapted to interfit with the socket in an adjacent seal block, the bolt-receiving apertures of said seal block extending through said bosses.

10. An annular shock-absorbing seal assembly formed of interconnected modular units, comprising:

a plurailty of individual seal blocks of resilient compressible material of given thickness, each having at least two bolt-receiving apertures, the bolt-receiving apertures of each block extending through the opposite ends of the block at a predetermined spacing from each other and in alignment with the corresponding apertures in the adjacent blocks;

each seal block having a projecting boss of given configuration at one end thereof and a recessed socket of complemental configuration at the opposite end thereof, the boss end of each block snugly fitting into the socket end of the next adjacent block;

a corresponding plurality of pairs of pressure plates, one pair of plates associated with each adjacent pair of seal blocks on opposite sides thereof, each plate having at least one bolt-receiving aperture extending therethrough; and a plurality of bolt members extending through the apertures in the pressure plates and in the seal blocks to mount said pressure plate members on said blocks and join the seal blocks in a complete annular assembly so that tightening of the bolt members compresses the seal blocks to expand the thickness of the seal

11. A seal assembly according to claim 10, in which each said boss is of convex arcuate configuration and each said boss is of concave arcuate configuration to afford a snug fit between adjacent seal blocks even though the angular relation thereof is changed by insertion of an additional seal block in or removal of a seal block from the assembly to alter its overall circumference.

References Cited

UNITED STATES PATENTS

| | | | |
|---|---|---|---|
| 703,469 | 7/1902 | Reinhold | 277—120 |
| 750,534 | 1/1904 | George | 277—199 X |
| 795,444 | 7/1905 | Kales | 277—104 |
| 2,743,780 | 5/1956 | Brown | 277—102 X |
| 2,968,500 | 1/1961 | Scaramucci | 277—199 X |
| 3,045,830 | 7/1962 | Fulton | 277—102 X |

FOREIGN PATENTS

| | | |
|---|---|---|
| 599,533 | 3/1948 | Great Britain. |

LAVERNE D. GEIGER, Primary Examiner

J. S. MEDNICK, Assistant Examiner

U.S. Cl. X.R.

277—102, 124, 235; 285—346